(12) United States Patent
Bosworth

(10) Patent No.: US 11,584,003 B2
(45) Date of Patent: Feb. 21, 2023

(54) AERIAL VEHICLE COMPRISING COMPLIANT ARM

(71) Applicant: Aurora Flight Sciences Corporation, a subsidiary of The Boeing Company, Manassas, VA (US)

(72) Inventor: William Robert Bosworth, Somerville, MA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 531 days.

(21) Appl. No.: 16/675,062

(22) Filed: Nov. 5, 2019

(65) Prior Publication Data

US 2021/0129317 A1    May 6, 2021

(51) Int. Cl.
*B25J 9/16*     (2006.01)
*B64C 39/02*    (2006.01)
*B25J 13/08*    (2006.01)
*B25J 15/00*    (2006.01)
(Continued)

(52) U.S. Cl.
CPC .............. *B25J 9/162* (2013.01); *B25J 13/085* (2013.01); *B25J 15/008* (2013.01); *B25J 15/0608* (2013.01); *B25J 15/0616* (2013.01); *B25J 15/10* (2013.01); *B64C 39/024* (2013.01)

(58) Field of Classification Search
CPC ...... B25J 9/162; B25J 13/085; B25J 19/0091; B64C 39/024; B64C 2201/128
See application file for complete search history.

(56) References Cited

U.S. PATENT DOCUMENTS

| | | | |
|---|---|---|---|
| 8,251,307 B2 * | 8/2012 | Goossen | B64C 39/024 244/76 R |
| 8,590,828 B2 * | 11/2013 | Marcus | B64C 39/024 244/23 B |
| 10,545,501 B1 * | 1/2020 | Lipton | G05D 1/101 |

(Continued)

FOREIGN PATENT DOCUMENTS

| | | |
|---|---|---|
| GB | 2569219 A | 6/2019 |
| KR | 102019634 B1 | 9/2019 |

OTHER PUBLICATIONS

European Patent Office, Extended European Search Report Issued in Application No. 20204278.4, dated Apr. 6, 2021, Germany, 10 pages.

(Continued)

*Primary Examiner* — Dean J Kramer
(74) *Attorney, Agent, or Firm* — Alleman Hall Creasman & Tuttle LLP

(57) ABSTRACT

A method for controlling an aerial vehicle including a compliant arm mechanism is disclosed. A propulsion system of the aerial vehicle is controlled to fly the aerial vehicle to an area proximate to a surface. One or more of the propulsion system and the compliant arm mechanism are controlled such that the compliant arm mechanism contacts the surface. The compliant arm mechanism is configured to extend laterally beyond a perimeter of the propulsion system. One or more sensor signals indicating contact of the compliant arm mechanism against the surface are received via a sensor. A force at which the aerial vehicle presses against the surface is determined based on the one or more sensor signals.

20 Claims, 9 Drawing Sheets

(51) Int. Cl.
  *B25J 15/06* (2006.01)
  *B25J 15/10* (2006.01)

(56) References Cited

U.S. PATENT DOCUMENTS

| | | | | |
|---|---|---|---|---|
| 10,712,286 | B1* | 7/2020 | Fetzer | G01N 29/225 |
| 2016/0158942 | A1* | 6/2016 | Augenbraun | G05D 1/0227 |
| | | | | 901/10 |
| 2019/0061933 | A1* | 2/2019 | Cappelleri | G05D 1/102 |
| 2019/0321971 | A1* | 10/2019 | Bosworth | B25J 9/1065 |
| 2019/0369057 | A1* | 12/2019 | Mattar | G01N 29/265 |

OTHER PUBLICATIONS

Ikeda, T. et al., "Wall contact by Octo-rotor UAV with one DoF manipulator for bridge inspection," Proceedings of the 2017 IEEE/RSJ International Conference on Intelligent Robots and Systems (IROS), Sep. 24, 2017, Vancouver, BC, Canada, 6 pages.

Trujillo, M. et al., "Novel Aerial Manipulator for Accurate and Robust Industrial NDT Contact Inspection: A New Tool for the Oil and Gas Inspection Industry," Sensors, vol. 19, No. 6, Mar. 15, 2019, 24 pages.

"Robotic Grasping," Yale University The Grab Lab, Available Online at https://www.eng.yale.edu/grablab/research_robotic.html, Oct. 26, 2018, 1 page.

European Patent Office, European Exam Report Issued in Application No. 20204278.4, dated Sep. 19, 2022, Germany, 6 pages.

* cited by examiner

AERIAL VEHICLE COMPRISING COMPLIANT ARM

FIELD

The present disclosure relates generally to the field of aerial vehicles, and more specifically to an aerial vehicle comprising a compliant arm mechanism.

BACKGROUND

Robotic arms may be employed in different applications, such as to pick up and place objects. Some robotic arms include an actuation system including a motor coupled to a high gear-ratio transmission. Such an actuation system has high torque density that allows for the robotic arm to efficiently lift and move objects. However, such an actuation system has high intrinsic friction and inertia that reduces an ability of a robotic arm to respond to mechanical contact. For example, when an endpoint of such a robotic arm contacts a hard surface, the contact dynamics (i.e., dynamic forces transferred as a result of the contact) are nearly instantaneous, and the actuation system does not allow for significant compliance of the robotic arm relative to the surface.

SUMMARY

According to one aspect of the present disclosure, an example method for controlling an aerial vehicle including a compliant arm mechanism is disclosed. A propulsion system of the aerial vehicle is controlled to fly the aerial vehicle to an area proximate to a surface. One or more of the propulsion system and the compliant arm mechanism are controlled such that the compliant arm mechanism contacts the surface. The compliant arm mechanism is configured to extend laterally beyond a perimeter of the propulsion system. One or more sensor signals indicating contact of the compliant arm mechanism against the surface are received via a sensor, and a force at which the aerial vehicle presses against the surface is determined based on the one or more sensor signals.

The features, functions, and advantages that have been discussed can be achieved independently in various embodiments or may be combined in yet other embodiments, further details of which can be seen with reference to the following description and drawings.

DETAILED DESCRIPTION

When an endpoint of a robotic arm driven by an actuation system including one or more motors coupled to a high gear-ratio transmission (e.g., 50:1 or greater) contacts a hard surface, the high intrinsic friction and inertia of the actuation system do not allow for meaningful active control of the motor(s) to control mechanical impedance of the robotic arm relative to the hard surface. In scenarios where such a robotic arm is coupled to an aerial vehicle, such that forces generated by the robotic arm can significantly interfere with flight dynamics of the aerial vehicle, such non-compliance of the robotic arm transfers the contact dynamics through the robotic arm to the aerial vehicle. Similarly, the flight dynamics of the aerial vehicle may interfere with the positioning of the robotic arm.

Thus, examples are disclosed that relate to compliant arm mechanisms for aerial vehicles, aerial vehicles including compliant arm mechanisms, and methods for controlling such aerial vehicles. As described in more detail below, a compliant arm mechanism according to the present disclosure controls a mechanical impedance of an endpoint of the aerial vehicle by one or both of damping contact dynamics resulting from contact with a surface and decoupling such contact dynamics from flight dynamics of the aerial vehicle. Additionally, such a compliant arm mechanism may be used to provide force sensing capabilities when the compliant arm mechanism contacts a surface for controlling mechanical impedance. In some examples, such force sensing capabilities are used to characterize a spatial relationship between the aerial vehicle and the surface that allows for control of an orientation of the aerial vehicle in relation to the surface. In other examples, when an endpoint of the compliant arm mechanism contacts a surface, the geometry of the compliant arm mechanism defines a relative position of the aerial vehicle and the surface. Further, in some examples, such force sensing capabilities are used to help place an object on the surface. Such a surface may be a substantially vertical surface, such as a wall, or sloped (e.g., inclined or declined) at any suitable angle. Further still, in some examples, the compliant arm mechanism is controlled to contact a surface to stabilize a position of the aerial vehicle. For example, if the aerial vehicle experiences a large gust of wind, then the compliant arm mechanism is controlled to contact and/or apply a force against a surface in order to stabilize the aerial vehicle.

Figure 1:
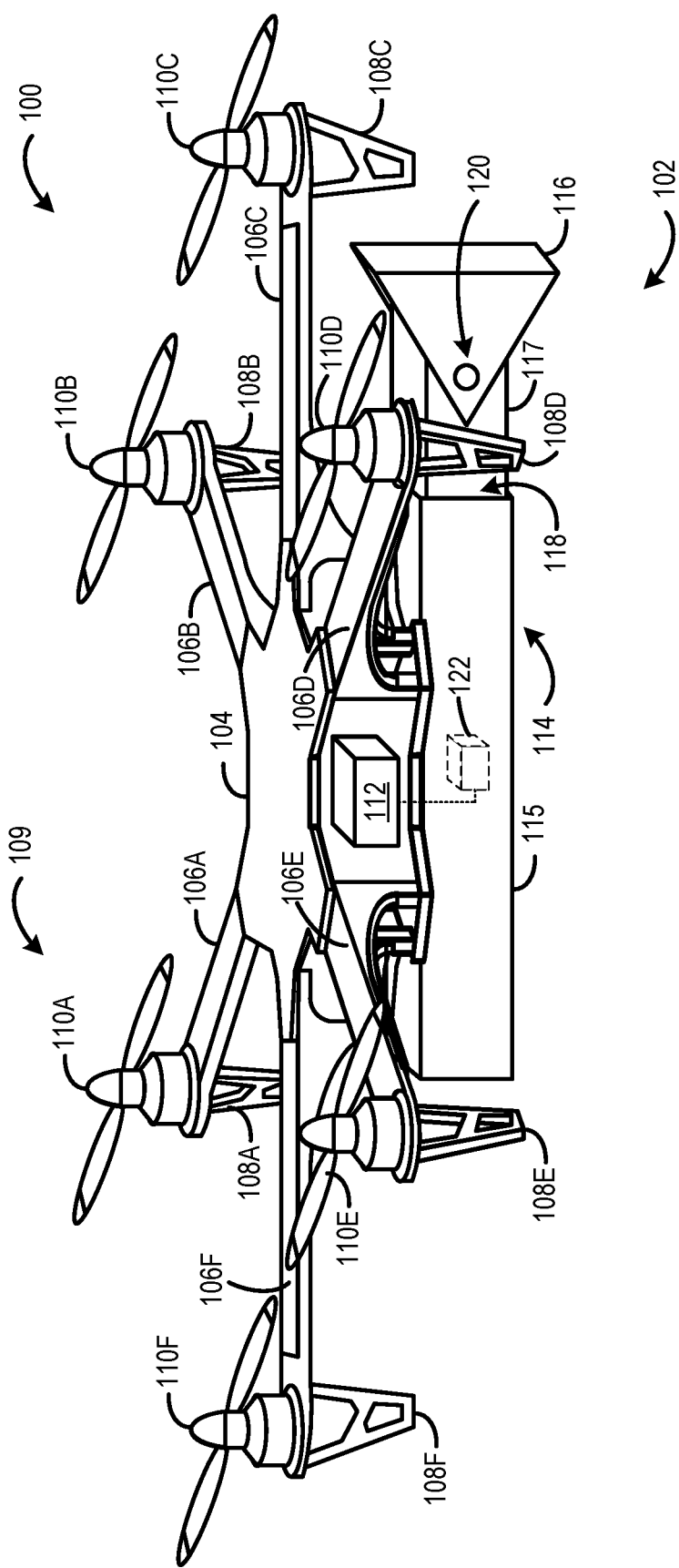
FIG. 1 is a diagrammatic representation of an exemplary embodiment of an aerial vehicle including a compliant arm mechanism.

FIG. 1 is a diagrammatic representation of an exemplary embodiment of an aerial vehicle 100 including a compliant arm mechanism 102. The aerial vehicle 100 comprises an airframe 104 (e.g., a fuselage or other structure), a plurality of booms 106A-F extending radially from the airframe 104, and a corresponding plurality of landing gear 108A-F, such that a landing gear is provided for each boom. In some examples, the airframe 104 and the plurality of booms 106A-F may be fabricated as a singular unit. In other examples, the airframe 104 and the plurality of booms 106 may be fabricated as separate components that are coupled to one another. In various examples, the components of the aerial vehicle 100 may be fabricated from metal, composite materials, polymeric materials, ceramic materials, and/or combinations thereof.

A propulsion system 109 is coupled to the airframe 104. In the illustrated example, the propulsion system 109 comprises a plurality of rotor propulsors 110A-F. Each rotor propulsor 110 is coupled at a distal end of a corresponding boom 106. Each rotor propulsor 110 is configured to rotate to direct thrust upward or downward relative to the airframe 104, and may include any suitable type of motor to rotate the rotor propulsor. The clockwise/counterclockwise orientation of the rotor propulsors 110A-F may be selected such that the net yaw moment on the aerial vehicle 100 is zero during normal hover and forward flight. While the propulsion system 109 is illustrated as having six rotor propulsors, it will be appreciated that the propulsion system 109 may include a greater or lesser number of rotor propulsors to achieve a desired function, such as achieving particular thrust requirements. In the illustrated embodiment, the aerial vehicle is configured as a vertical take-off and landing type vehicle. In other embodiments, the propulsion system may take any other suitable form. The propulsion system 109 is controlled by an aircraft control system (also referred to herein as a controller) 112 to fly the aerial vehicle 100.

The aerial vehicle is outfitted with the compliant arm mechanism 102 to control a mechanical impedance of an endpoint of the aerial vehicle 100 to shape contact dynamics, as well as to provide force sensing capabilities when an endpoint of the aerial vehicle 100 contacts a surface. The compliant arm mechanism 102 is configured to control mechanical impedance by controlling one or both of a compliance (e.g., a force responsive to a position) and a damping (e.g., a force responsive to a velocity) of the compliant arm mechanism 102. In some examples, the compliant arm mechanism 102 is configured to control other force/kinematic relationships. Further, in some examples, such force sensing capabilities are used to characterize a spatial relationship between the aerial vehicle 100 and the surface such that an orientation of the aerial vehicle 100 can be controlled in relation to the surface. In some examples, such force sensing capabilities are used to control flight stability of the aerial vehicle 100. Further, in some examples, the compliant arm mechanism 102 is configured to releasably hold an object, and such force sensing capabilities are used to help place the object on the surface.

The compliant arm mechanism 102 is coupled to an underside of the airframe 104 such that the compliant arm mechanism 102 does not interfere with operation of the propulsion system 109. The compliant arm mechanism 102 provides a compact configuration during flight of the aerial vehicle 100 to simplify flight dynamics (e.g., a center of mass of the compliant arm mechanism 102 is positioned proximate to a center of mass of the aerial vehicle 100 during flight). Further, the compliant arm mechanism 102 is sized and positioned to allow the plurality of landing gears 108 to touch down during landing of the aerial vehicle 100.

In some embodiments, the compliant arm mechanism 102 is integral with the aerial vehicle 100. In other embodiments, the compliant arm mechanism 102 is configured as a retrofit system to removably attach to the aerial vehicle 100 or any other aircraft capable of carrying the compliant arm mechanism 102.

The compliant arm mechanism 102 provides one or more degrees of freedom of movement to reach out laterally from the aerial vehicle 100 beyond a perimeter of the propulsion system 109 to interact with a surface while preventing the propulsion system 109 from contacting the surface.

The compliant arm mechanism 102 includes a compliant limb 114 coupled to a hand 116. The compliant limb 114 comprises a first limb portion 115 and a second limb portion 117 coupled together via an extendable joint 118. The extendable joint 118 is configured to move the compliant limb 114 between a retracted position and an extended position. In the retracted position, the second limb portion 117 is retracted within the first limb portion 115. In the extended position, the second limb portion 117 moves outward and extends laterally beyond the perimeter of the propulsion system 109. For example, the compliant limb 114 may be retracted via the extendable joint 118 during dynamic flight of the aerial vehicle 100, and the compliant limb 114 may be extended via the extendable joint 118 when the aerial vehicle 100 is hovering proximate to a surface, such as a wall. The extendable joint 118 may take any suitable form. For example, the extendable joint may comprise a prismatic joint or a telescopic joint.

The compliant arm mechanism 102 comprises a wrist joint 120 formed between the compliant limb 114 and the hand 116. The wrist joint 120 provides at least one degree of freedom of movement of the compliant hand 116 relative to the compliant limb 114. The at least one degree of freedom of movement of the wrist joint 120 allows for the compliant hand 116 to be oriented substantially flat against a surface during contact with the surface even when the compliant limb 114 is not perpendicular to the surface. In the illustrated example, the wrist joint 120 provides the compliant hand 116 one degree of freedom such that the compliant hand 116 can rotate to press against a sloping surface or can compensate for the compliant limb 114 not being perpendicular to the surface. In other examples, the wrist joint 120 provides two or more degrees of freedom of movement. In any case, the compliance provided by the wrist joint 120 aids the aerial vehicle 100 in placing an object on a surface, in some examples. Moreover, the extendable joint 118 and the wrist joint 120 cooperate to reduce the influence of contact dynamics from when the compliant arm mechanism 102 contacts a surface on the flight dynamics of the aerial vehicle 100.

Figure 2:
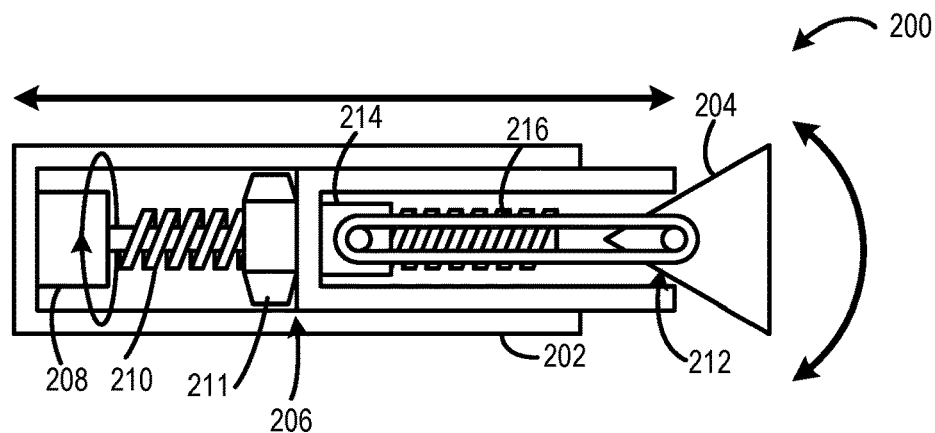
FIG. 2 is a diagrammatic representation of an exemplary embodiment of an actively compliant arm mechanism.

In some embodiments, the compliant arm mechanism includes one or more motor-driven actuators to provide active impedance control (e.g., compliance and/or damping). FIG. 2 is a diagrammatic representation of an exemplary embodiment of an actively compliant arm mechanism 200. For example, the actively compliant arm mechanism 200 corresponds to the compliant arm mechanism 102 shown in FIG. 1. The actively compliant arm mechanism 200 includes a compliant limb 202 coupled to a hand 204. The compliant limb 202 includes an extendable joint 206 that is configured to actively extend and retract the compliant limb 202 via a motor 208. In the illustrated example, the motor 208 drives a screw 210 that interfaces with a nut 211 that is coupled to the compliant joint 206 to extend and retract the compliant limb 202. In other examples, the extendable joint is driven by other types of active drive mechanisms, such as a motor-driven rack-and-pinion or a motor-driven belt.

The hand 204 is coupled to the compliant limb 202 via a wrist joint 212 that is configured to actively rotate the hand 204 via a motor 214. The motor 214 is configured to drive a belt 216 that is coupled to the hand 204. For example, the motor 214 rotates the belt 216 in a counterclockwise direction to rotate the hand 204 upward and in a clockwise direction to rotate the hand 204 downward.

The active drive mechanism (e.g., the drive screw 210 driven by the motor 208 and/or the drive belt 216 driven by the motor 214) is configured to have some degree of compliance or damping built-in such that when the actively compliant arm mechanism 200 contacts a surface, contact dynamics are transferred through and absorbed by the drive mechanism. Moreover, such contact dynamics are determined as a force based on one or more sensor signals received via one or more sensors of the aerial vehicle, and one or more of the motors 208 and 214 are controlled based on the sensor signals to adjust the actively compliant arm mechanism 200 to counteract for the determined force. In this way, the actively compliant arm mechanism 200 reduces the effect of contact dynamics on the flight dynamics of the aerial vehicle when the actively compliant arm mechanism 200 contacts a surface.

The drive screw 210 and the drive belt 216 are examples of actively compliant components that are driven by one or more motors that control the dominant mechanical impedance performance of the compliant arm mechanism. In other examples, the actively compliant arm mechanism 200 may include any suitable type of actively compliant motor-driven components. In the illustrated example, the actively compliant arm mechanism 200 comprises movement in two degrees of freedom, but the compliant arm mechanism may have three or more degrees of freedom of movement in other examples.

Figure 3:
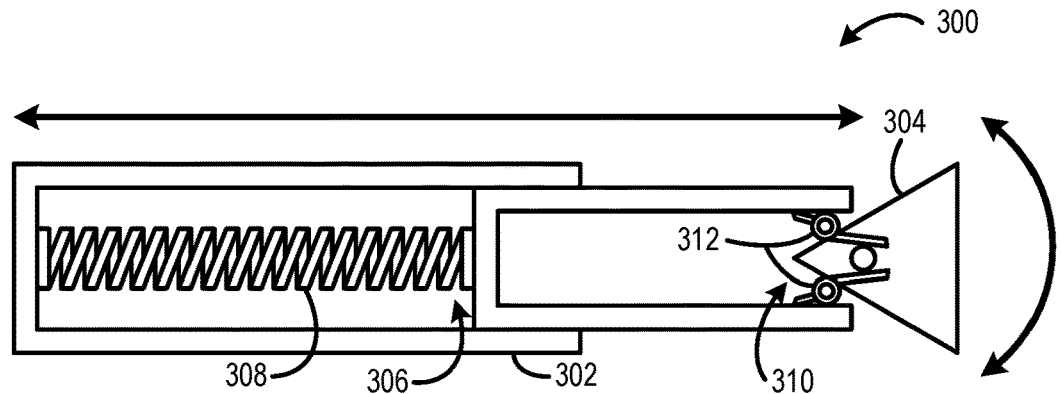
FIG. 3 is a diagrammatic representation of an exemplary embodiment of a passively compliant arm mechanism.

In some embodiments, the compliant arm mechanism includes one or more passive components to provide passive compliance through physical deformation of the passive components. FIG. 3 is a diagrammatic representation of an exemplary embodiment of a passively compliant arm mechanism 300 suitable for use as the compliant arm mechanism 102 shown in FIG. 1. The passively compliant arm mechanism 300 includes a compliant limb 302 coupled to a hand 304. The compliant limb 302 includes a compressible joint 306 that is configured to passively compress the compliant limb 302 responsive to a contact force being applied to the passively compliant arm mechanism 300. In this example, the compressible joint 306 includes a helical spring 308 that is configured to bias the compliant limb 302 laterally outward and compress responsive to a contact force that is greater than a spring force of the helical spring 308. In some embodiments, a damper (e.g., an elastic material) is used as a compliant component in addition to, or in place of the helical spring 308 in the compliant arm mechanism 300.

The hand 304 is coupled to a wrist joint 310 that is configured to passively rotate the hand 304 responsive to a contact force being applied to the hand 304. In particular, the wrist joint 310 includes a pair of opposing torsion springs 312 that cooperatively bias the hand 304 in a center position when the passively compliant arm mechanism 300 is not in contact with a surface. Further, the pair of opposing torsion springs 312 allows the hand 304 to rotate in a particular direction responsive to a contact force that is not perpendicular to the face of the hand 304 being greater than a spring force of the torsion springs. As one example, the hand 304 rotates upward responsive to contacting a surface that is not parallel with a contact surface of the hand 304 and sloped outward toward the passively compliant arm mechanism 300. As another example, the hand 304 rotates downward responsive to contacting a surface that is not parallel with a contact surface of the hand 304 and sloped away from the passively compliant arm mechanism 300.

In some embodiments that include a fully passive compliant arm mechanism, the compliant arm mechanism is configured to extend laterally beyond a perimeter of the propulsion system on a permanent basis as opposed to extending and retracting.

The helical spring 308 and the pair of torsion springs 312 are examples of passively compliant components, and the passively compliant arm mechanism 300 may include any suitable type of passively compliant components. For example, the passively compliant arm mechanism may include one or more other types of springs and/or one or more dampers. In the illustrated example, the passively compliant arm mechanism 300 provides two degrees of freedom of movement. The impedance control characteristics (e.g., spring force, damping force) of the passively compliant components may be selected so that the contact dynamics of the compliant arm mechanism are not too large to disturb a position of the aerial vehicle when the compliant arm mechanism contacts a surface.

In some embodiments, a compliant arm mechanism includes both active and passive compliant components. For example, the compliant limb may include both a helical spring to passively absorb a contact force and a motor to actively extend and retract the compliant limb.

Figure 4:
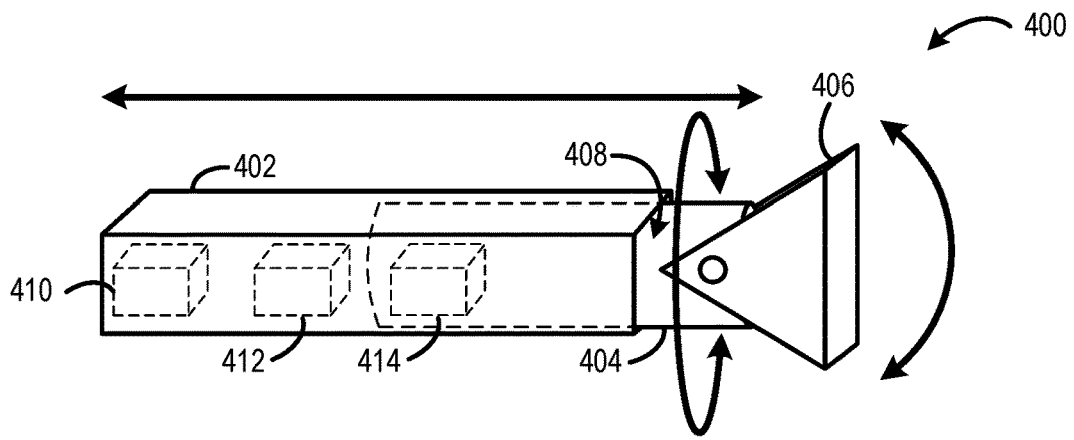
FIG. 4 is a diagrammatic representation of an exemplary embodiment of a compliant arm mechanism comprising three degrees of freedom of movement.

FIG. 4 is a diagrammatic representation of an exemplary embodiment of a compliant arm mechanism 400 suitable for use as compliant arm mechanism 102 of FIG. 1 that provides three degrees of freedom of movement. The compliant arm mechanism 400 includes a compliant limb 402 coupled to a wrist joint 404. The wrist joint 404 is coupled to a hand 406. The compliant limb 402 includes an extendable joint 408 that is configured to actively expand and retract the compliant limb 402 via a motor 410. The compliant limb 402 may be driven by the motor 410 via any suitable drive mechanism. The wrist joint 404 is configured to actively rotate the hand 406 to any suitable radial position in 360 degrees via a motor 412, and may actively rotate the wrist joint 404 via any suitable drive mechanism. Further, the hand 406 is configured to actively rotate upward and downward via a motor 414. The motor 414 may actively rotate the hand 406 via any suitable mechanism. Further, the motors 410, 412, and 414 are controlled cooperatively in three degrees of freedom to orient hand 406 in any suitable position to interact with a surface.

Returning to FIG. 1, the compliant arm mechanism 102 comprises one or more sensors 122 configured to output one or more sensor signals indicating a force applied by the compliant arm mechanism 102 against a surface when the compliant arm mechanism 102 contacts and/or presses against the surface. The one or more sensors 122 may take any suitable form. For example, the one or more sensors may include one or more of a linear potentiometer, an encoder, a strain gauge, and a Hall effect sensor. As one example, the one or more sensors sense operation of a motor that is configured to actuate the extendable joint 118. The compliant arm mechanism 102 additionally or alternatively may include additional sensors located at other joints of the compliant arm mechanism. Such additional sensors may include position sensors that are configured to measure a position of a component (e.g., wrist joint, hand, finger) of the compliant arm mechanism 102 and/or force sensors that are configured to measure forces applied to such components of the compliant arm mechanism 102. In some examples, signals from both force and position sensors may be used cooperatively to control the mechanical impedance of the compliant arm mechanism.

In some embodiments, the compliant arm mechanism is configured to releasably hold an object such that the aerial vehicle is used to place the object on a surface. In one example, the aerial vehicle is used to place a surveillance camera on a vertical surface, such as a wall of a building that otherwise would be difficult for a human to access. The compliant arm mechanism may be configured to releasably hold any suitable type of object for placement of the object on a surface. FIGS. 5-9 are diagrammatic representations of exemplary embodiments of compliant arm mechanisms suitable for use as the compliant arm mechanism of FIG. 1 that have different configurations for releasably holding an object.

Figure 5:
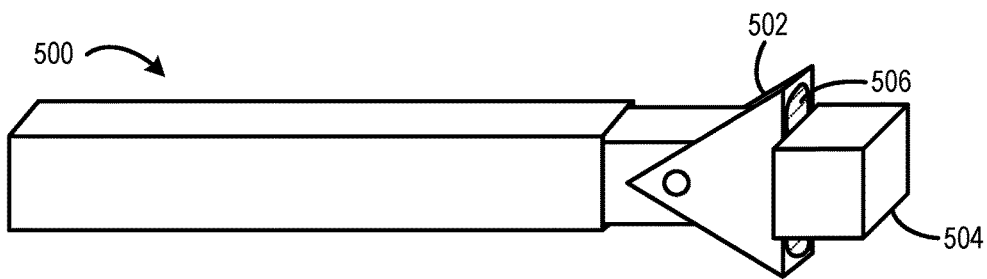
FIG. 5 is diagrammatic representation of an exemplary embodiment of a compliant arm mechanism configured to hold an object via adhesive.

In the example of FIG. 5, a compliant arm mechanism 500 includes a hand 502 configured to hold an object 504 via an adhesive 506. The adhesive 506 has bonding characteristics that allow the object to release from the hand 502. In some examples, the object 504 is configured with a mechanical attachment mechanism and/or other adhesive to allow the object to attach to a surface and release from the adhesive 506. Any suitable adhesive may be used to releasably hold the object 504 to the hand 502.

Figure 6:
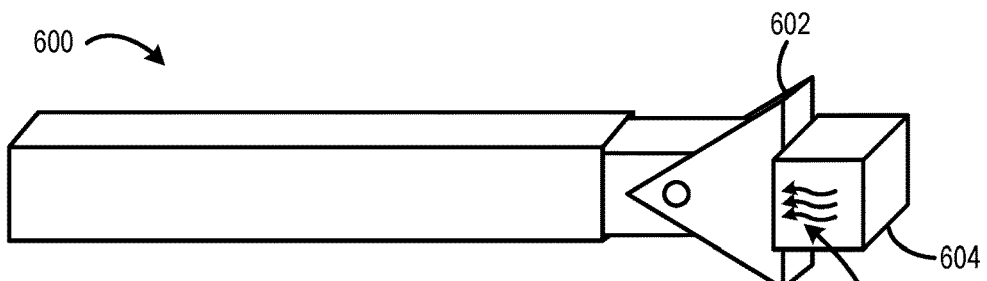
FIG. 6 is diagrammatic representation of an exemplary embodiment of a compliant arm mechanism configured to hold an object via vacuum.

In the example of FIG. 6, a compliant arm mechanism 600 includes a hand 602 configured to hold an object 604 via vacuum 606. In one example, the compliant arm mechanism 600 includes a pump that forms the vacuum 606 between the hand 602 and the object 604. In other examples, the vacuum 606 is maintained passively, such as via a suction cup or external vacuum generating device (e.g., to draw a vacuum prior to flight) that is applied to the hand 602 and/or the object 604.

Figure 7:
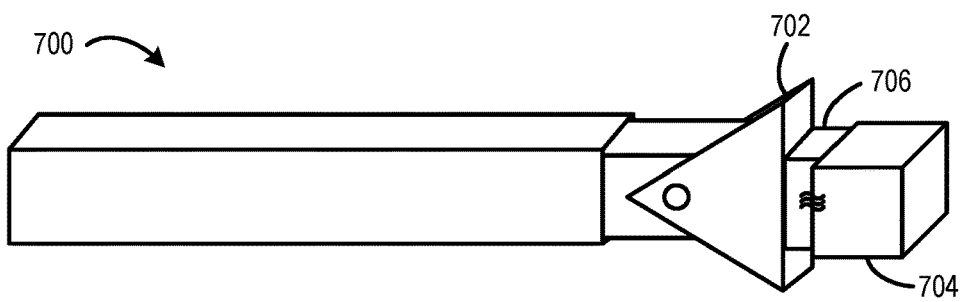
FIG. 7 is diagrammatic representation of an exemplary embodiment of a compliant arm mechanism configured to hold an object via a magnet.

In the example of FIG. 7, a compliant arm mechanism 700 includes a hand 702 configured to hold an object 704 via a magnet 706, wherein the object comprises a material that is attracted by magnetic force. In some examples, the magnet 706 is a ferromagnet, such as a rare earth magnet. In other examples, the magnet 706 is an electromagnet. Further, in some examples, the object 704 comprises a ferromagnet or electromagnet and the hand 702 includes a material attracted by magnetic force. Further, in some examples, the object 704 is configured to be attached to the surface via magnetic attraction to the surface.

Figure 8:
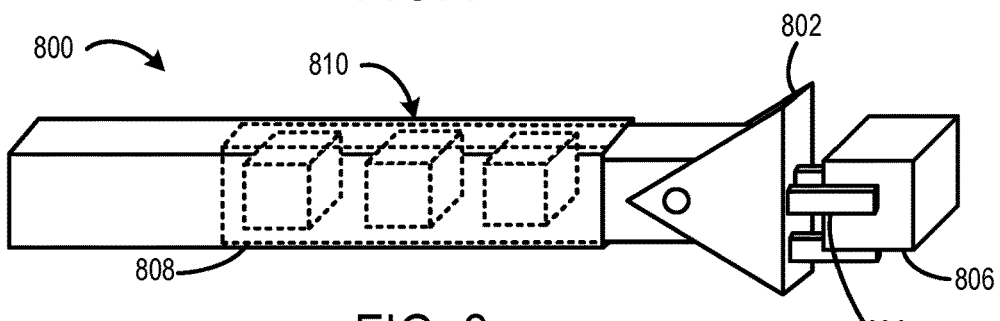
FIG. 8 is diagrammatic representation of an exemplary embodiment of a compliant arm mechanism configured to hold an object via a friction-based grip.

In the example of FIG. 8, a compliant arm mechanism 800 includes a hand 802 comprising a plurality of fingers 804. The plurality of fingers 804 is configured to hold an object 806 via a friction-based grip. The plurality of fingers 804 are sized and shaped specifically to match the shape of the object 806 such that the plurality of fingers 804 can releasably hold the object 806. In the depicted example, the plurality of fingers 804 have fixed positions to create the friction-based grip of the object 806. In some examples, the object 806 includes adhesive or mechanical attachment mechanism for attaching the object 806 securely enough to overcome the friction-based grip of the hand 804.

Figure 9:
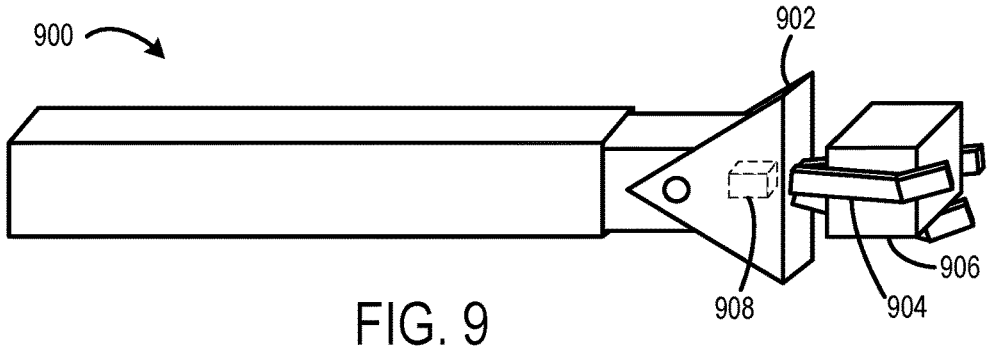
FIG. 9 is diagrammatic representation of an exemplary embodiment of a compliant arm mechanism configured to hold an object via actuatable fingers.

In the example of FIG. 9, a compliant arm mechanism 900 includes a hand comprising a plurality of actuatable fingers 904 configured to hold an object 906. The plurality of actuatable fingers 904 is actively driven via a motor 908. In some examples, a plurality of motors are used, such that each of the fingers 904 is individually actuatable to open and close around the object 906. Further, in some examples, each actuatable finger 904 is articulated to form different grips around different shaped objects.

The above described embodiments are provided as examples, and a compliant arm mechanism may be configured to releasably hold an object in any suitable manner. In any of these examples, the compliant arm mechanism provides a compact configuration during regular flight to simplify flight dynamics, and provides sufficient degrees of freedom of movement to reach out and compliantly place an object onto a surface. The compliant arm mechanism has intrinsic compliance control which provides favorable dynamics for the aerial vehicle and the compliant arm mechanism during placement of the object on the surface.

In some embodiments, a compliant arm mechanism is configured to releasably hold a plurality of objects for placement at different locations. As one example, shown in FIG. 8, the compliant arm mechanism 800 comprises a magazine 808 configured to hold a plurality of objects 810. The magazine 808 is configured such that when one object is placed a next object in the magazine 808 moves into a position to be placed. Further, in some embodiments, an aerial vehicle includes a plurality of compliant arm mechanisms. In some such embodiments, each of the plurality of compliant arm mechanisms is configured to releasably hold a different object. Additionally, in some embodiments, multiple compliant arm mechanisms are configured to cooperatively releasably hold a single object. In some such embodiments, different compliant arm mechanisms may have different functions. As one example, one compliant arm mechanism is used for sensing contact and pressing force against a surface and another compliant arm mechanism is used to place an object on the surface.

Returning to FIG. 1, the aircraft control system 112 is configured to control the various aircraft components and functions of the aerial vehicle 100. For example, the aircraft control system 112 is configured to control operation of various actuators (e.g., rotor propulsors 110, actuators of compliant arm mechanism 102, sensors (e.g., optical sensors)) in response to commands from an operator, autopilot, a navigation system, or other high-level system. In operation, the aircraft control system 112 is configured to dynamically (i.e., in real-time or near real-time) and independently adjust thrust from each of the rotor propulsors 110 during various stages of flight (e.g., take-off, flying, landing) to control roll, pitch, or yaw of the aerial vehicle 100. In one example, the aircraft control system 112 individually varies the speed (revolutions per minute (RPM)) of the rotor propulsors 110 to control flight of the aerial vehicle 100.

The aircraft control system 112 includes one or more processors communicatively coupled with one or more memory devices. The one or more processors are configured to execute instructions stored in the one or more memory devices. For example, the one or more processors may be configured to execute instructions that are part of one or more applications, services, programs, routines, libraries, objects, components, data structures, or other logical constructs. The one or more processors may be configured to execute software instructions. Additionally, or alternatively, the one or more processors may be configured to execute hardware or firmware instructions. The one or more processors may be single-core or multi-core, and the instructions executed thereon may be configured for sequential, parallel, and/or distributed processing. The one or more storage device may include volatile, nonvolatile, dynamic, static, read/write, read-only, random-access, sequential-access, location-addressable, file-addressable, and/or content-addressable devices. Aspects of the one or more processors and the one or more memory devices may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The aircraft control system 112 may comprise various sensors including a global positioning system (GPS), an Inertial Navigation System (INS), and/or an inertial measurement unit (IMU) that may include one or more gyroscopes and/or accelerometers. Such sensors indicate inertial stabilization data that is used to control the orientation of the aerial vehicle 100. In some embodiments, aerial vehicle 100 may be equipped with one or more cameras (e.g., an optical instrument for recording or capturing images and/or video, including light detection and ranging (LIDAR) devices), audio devices (e.g., microphones, echolocation sensors, etc.), and other sensors, such as motion capture sensors, radio-beacons, infrared sensors, acoustic sensors, etc.

In some embodiments, the aircraft control system 112 includes a wireless transceiver configured to communicate data between the aerial vehicle 100 and a remote device (e.g., smartphone, tablet, laptop computer, base station). For example, the wireless transceiver is configured to communicate data (processed data, unprocessed data, etc.) with the remote device over a wireless network using one or more wireless standards such as Bluetooth, near-field communication (NFC), Wi-Fi, etc. In some examples, the remote device may facilitate monitoring and/or control of the aerial vehicle 100. In other examples, the aerial vehicle 100 may be partially or fully autonomous.

The aircraft control system 112 is configured to control the aerial vehicle 100 to perform various operations in relation to positioning the aerial vehicle 100 relative to a surface, such as a wall. The aircraft control system 112 uses the one or more sensors 122 of the compliant arm mechanism 102 to provide feedback to control the aerial vehicle 100 relative to the surface. In some instances, the aircraft control system 112 is configured to place an object held by the compliant arm mechanism 102 on the surface based on feedback provided by the one or more sensors 122.

FIGS. 10-12 are diagrammatic representations of different example scenarios in which an aerial vehicle interacts with a surface via a compliant arm mechanism. FIGS. 10A-10F are diagrammatic representations of an example scenario in which an aerial vehicle 1000 places an object 1006 on a vertical surface 1002 via a compliant arm mechanism 1004.

Figure 10A:
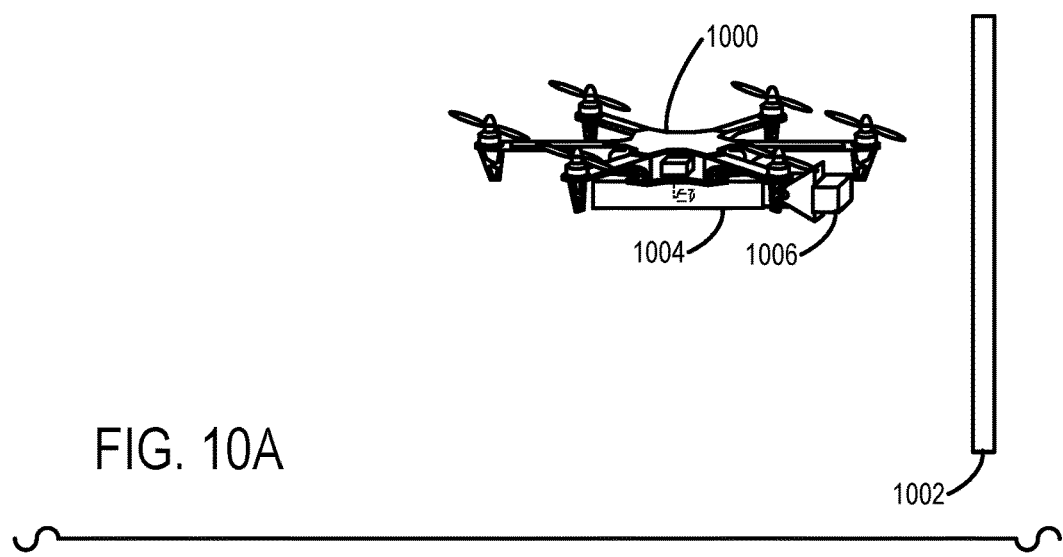
FIGS. 10A-10F are diagrammatic representations of an example scenario in which an aerial vehicle places an object on a vertical surface via a compliant arm mechanism.
Figure 10B:
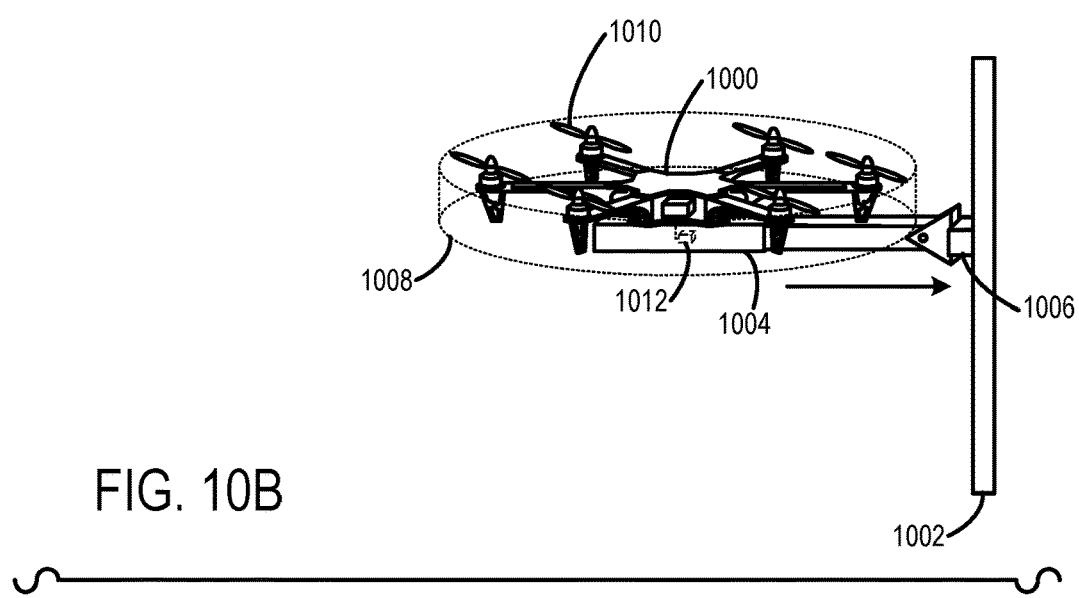

In FIG. 10A, the aerial vehicle 1000 flies to an area proximate to the vertical surface 1002. For example, the area may be identified via optical sensors, a beacon located on the surface, visual observation of a human controller, or another recognition method. In FIG. 10B, the aerial vehicle 1000 extends the compliant arm mechanism 1004 laterally beyond a perimeter 1008 of a propulsion system 1010 of the aerial vehicle 1000 towards the vertical surface 1002. The aerial vehicle 1000 controls the propulsion system 1010 and/or the compliant arm mechanism 1004 such that the compliant arm mechanism 1004 contacts the vertical surface 1002 via the object 1006. The aerial vehicle 1000 receives, via one or more sensors 1012, one or more sensor signals indicating contact of the compliant arm mechanism 1004 against the vertical surface 1002 via the object 1006. The aerial vehicle 1000 determines a force at which the aerial vehicle 1000 contacts the vertical surface 1002 based on the one or more sensor signals. In some examples, both of the contact and the force are determined using the same sensor(s). In other examples, the contact and the force are determined using different sensors.

Figure 10C:
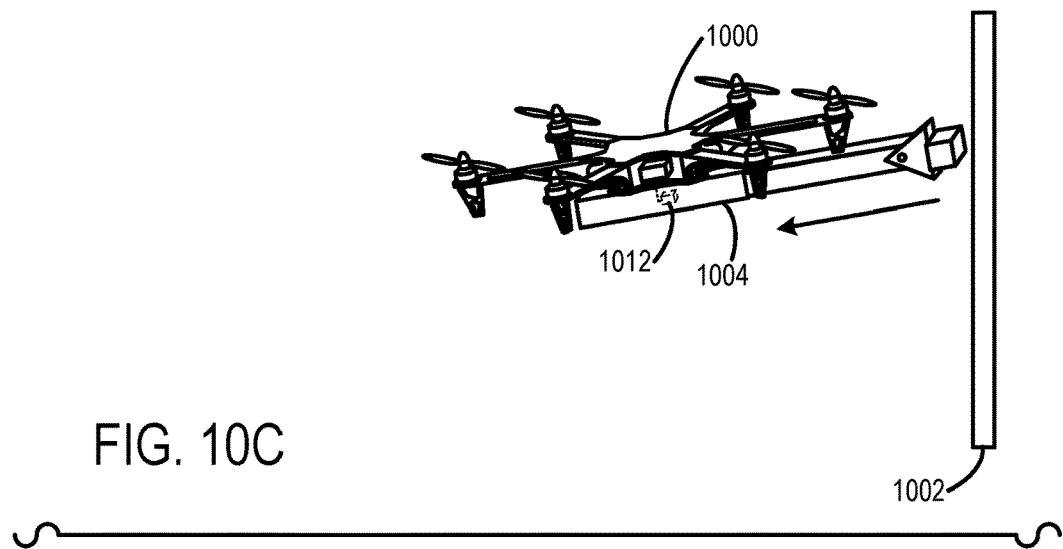
Figure 10D:
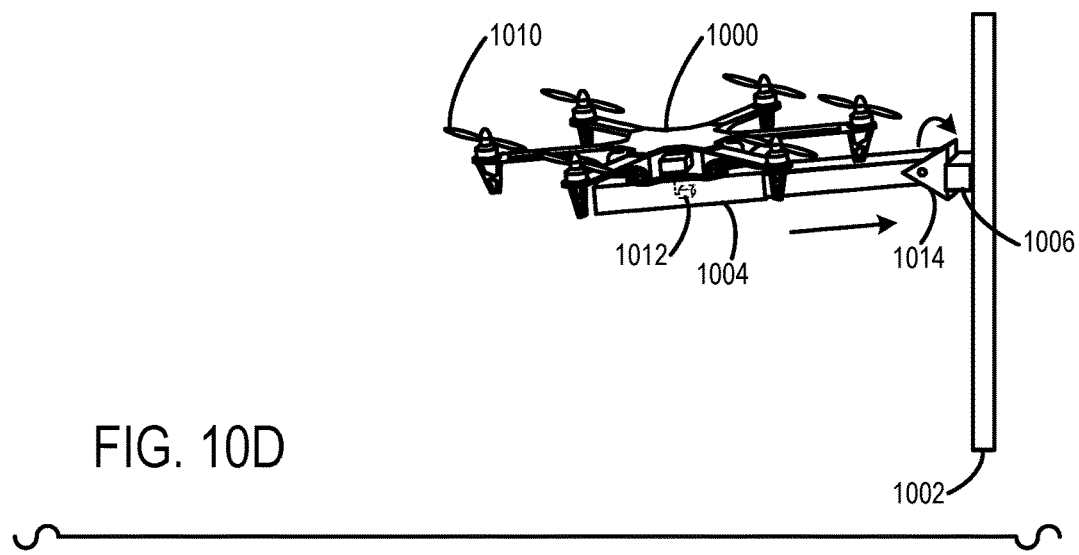

In FIG. 10C, the aerial vehicle 1000 bounces off the vertical surface 1002 as a result of the contact with the compliant arm mechanism 1004. The contact with the vertical surface 1002 causes the orientation of the aerial vehicle 1000 to change relative to the vertical surface 1002. The aerial vehicle 1000 receives the bounce based on a force signature determined from the one or more sensor signals of the one or more sensors 1012. In this scenario, although the compliant arm mechanism 1004 was able to absorb some degree of force from contacting the vertical surface 1002, the overall force was great enough to cause the aerial vehicle 100 to move away from the vertical surface 1002. Note that in some examples, the impedance control characteristics of the compliant arm mechanism may be selected so that the contact dynamics are not too large to disturb the position of the aerial vehicle.

In 10D, the aerial vehicle 1000 controls one or more of the propulsion system 1010 and the compliant arm mechanism 1004 to move back toward the vertical surface 1002 such that the object 1006 contacts the vertical surface 1002. Due to the change in orientation of the aerial vehicle 1000 as a result of the bounce, the object 1006 is not oriented flush with the vertical surface 1002, which is determined by the aerial vehicle 1000 via sensor signals from the one or more sensors 1012. Since the force due to the prior contact is known, the aerial vehicle 1000 can control one or more of the propulsion system 1010 and the compliant arm mechanism 1004 based on that force to mitigate disturbance forces as the aerial vehicle 1000 reengages with the vertical surface. A hand 1014 of the compliant arm mechanism 1004 is rotated such that the object 1006 is aligned against the vertical surface 1002. Depending on the configuration of the aerial vehicle 1000, the hand 1014 may be actively rotated via a motor or passively rotated based on control of the propulsion system 1010. Additionally, or alternatively, the aerial vehicle 1000 could reorient itself via control of the propulsion system 1010 to aid in alignment of the object 1006 against the vertical surface 1002. The aerial vehicle 1000 controls one or more of the propulsion system 1010 and the compliant arm mechanism 1004 to control a force exerted against the vertical surface 1002 by the object 1006 during placement of the object 1006 on the vertical surface 1002 based upon one or more sensor signals indicating a force exerted against the vertical surface 1002 by the object 1006 while placing the object 1006 on the vertical surface 1002. In some examples, controlling the force exerted against the vertical surface 1002 during placement of the object 1006 on the vertical surface 1002 comprises maintaining the force above a threshold force for at least a threshold duration. The threshold force and the threshold duration may be set to suitable levels to enable the object 1006 to attach to the vertical surface 1002.

In some examples, the force determined based on contact of the compliant arm mechanism with the vertical surface optionally may be used by the aerial vehicle to control flight stability. For example, if the aerial vehicle is experiencing ten newtons of lateral disturbance (e.g., as a result of contacting the surface), the aerial vehicle can respond to the force measured by the compliant arm mechanism faster than if the aerial vehicle were to wait for a center of mass position measured by a sensor of the aircraft control system to deviate enough as a result of the disturbance to compensate for the disturbance.

Figure 10E:
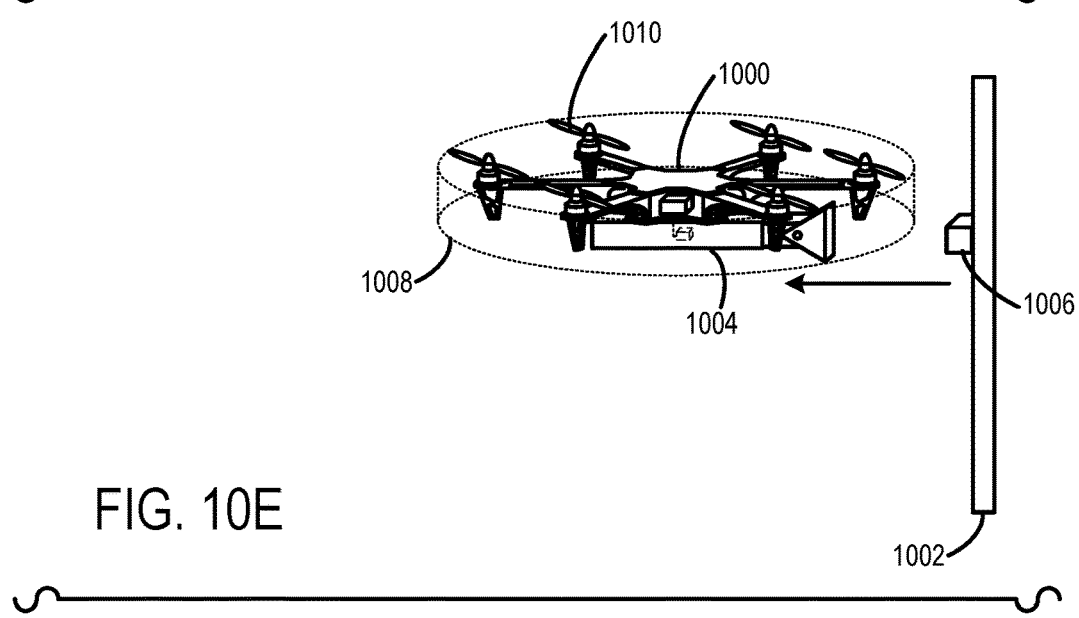
Figure 10F:
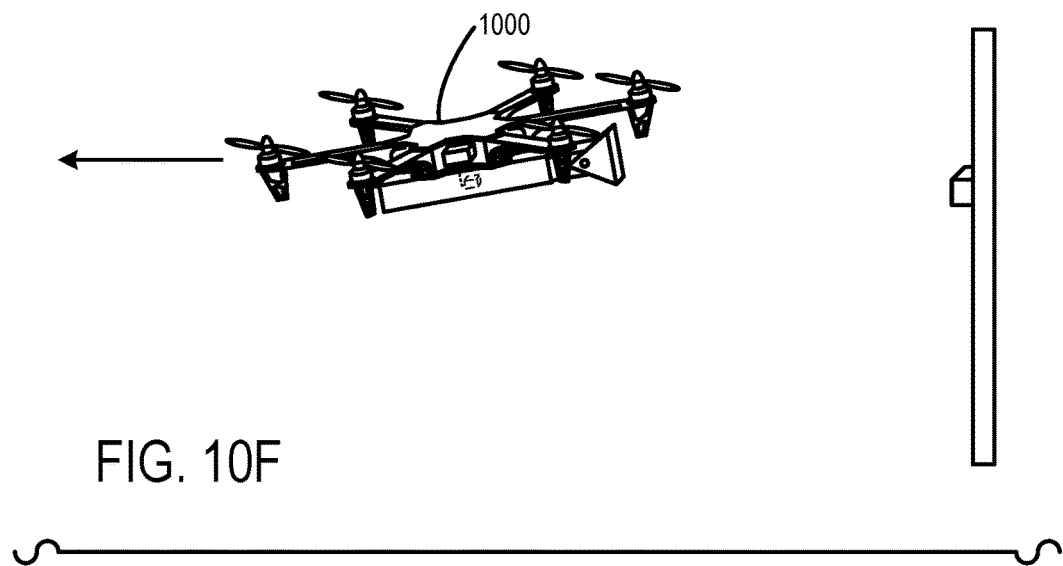

In FIG. 10E, the object 1006 is attached to the vertical surface 1002. The aerial vehicle 1000 releases the object 1006 from the compliant arm mechanism 1004 and moves the compliant arm mechanism 1004 from an extended position to a retracted position within the perimeter 1008 of the propulsion system 1010 of the aerial vehicle 1000. In FIG. 10F, the aerial vehicle 1000 controls the propulsion system 1010 to fly away from the vertical surface 1002 to perform another mission.

Figure 11A:
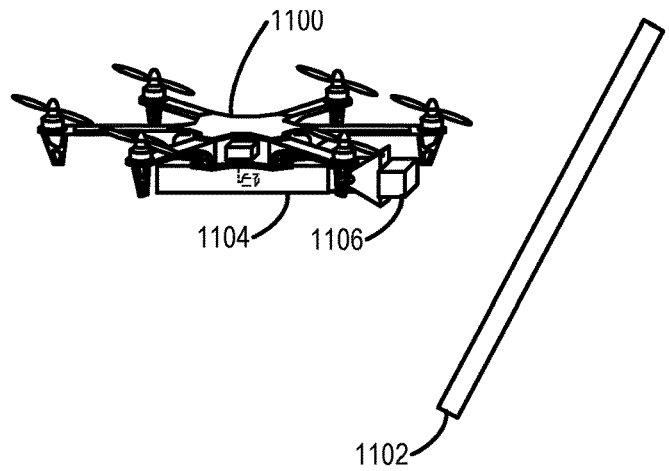
FIGS. 11A-11E are diagrammatic representations of an example scenario in which an aerial vehicle places an object on an inclined surface via a compliant arm mechanism.
Figure 11B:
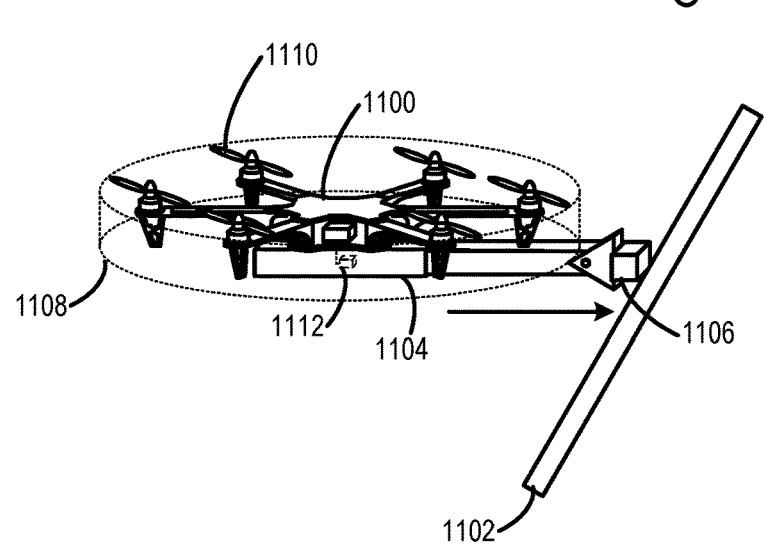

FIGS. 11A-11E are diagrammatic representations of an example scenario in which an aerial vehicle 1100 places an object 1106 on an inclined surface 1102 via a compliant arm mechanism 1104. In FIG. 11A, the aerial vehicle 1100 flies to an area proximate to the inclined surface 1102. In FIG. 11B, the aerial vehicle 1100 extends the compliant arm mechanism 1104 laterally beyond a perimeter 1108 of a propulsion system 1110 of the aerial vehicle 1100 towards the inclined surface 1104. The aerial vehicle 1100 controls one or more of the propulsion system 1110 and the compliant arm mechanism 1104 such that the compliant arm mechanism 1104 contacts the inclined surface 1102 via the object 1106. The aerial vehicle 1100 receives, via one or more sensors 1112, one or more sensor signals indicating contact of the compliant arm mechanism 1104 against the inclined surface 1102 via the object 1106. The aerial vehicle 1100 determines a force at which the aerial vehicle 1100 contacts the inclined surface 1102 based on the one or more sensor signals.

Figure 11C:
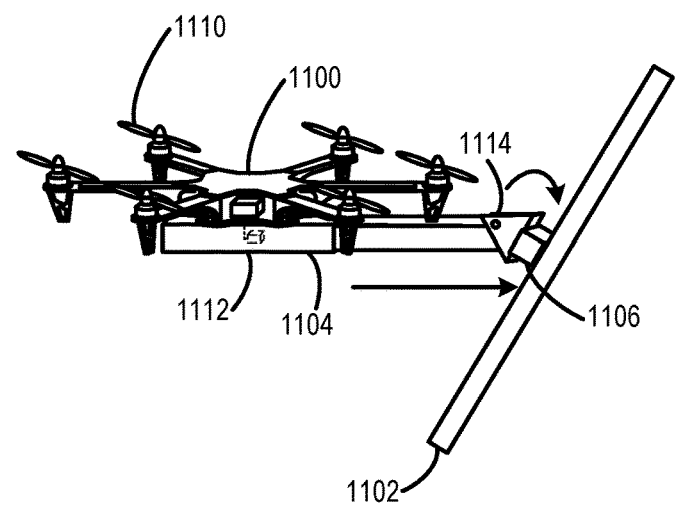

In FIG. 11C, a hand 1114 of the compliant arm mechanism 1104 is rotated such that the object 1106 is aligned against the inclined surface 1102 based on the determined force. Depending on the configuration of the aerial vehicle 1100, the hand 1114 may be actively rotated via a motor or passively rotated based on control of the propulsion system 1110. Additionally, or alternatively, the aerial vehicle 1100 could reorient itself via control of the propulsion system 1110 to aid in alignment the object 1106 flush against the inclined surface 1102. The aerial vehicle 1100 controls a force exerted against the inclined surface 1102 by the object 1106 during placement of the object 1106 on the inclined surface 1102 based upon one or more sensor signals indicating a force exerted against the inclined surface 1102 by the object 1106 while placing the object 1106 on the inclined surface 1102.

Figure 11D:
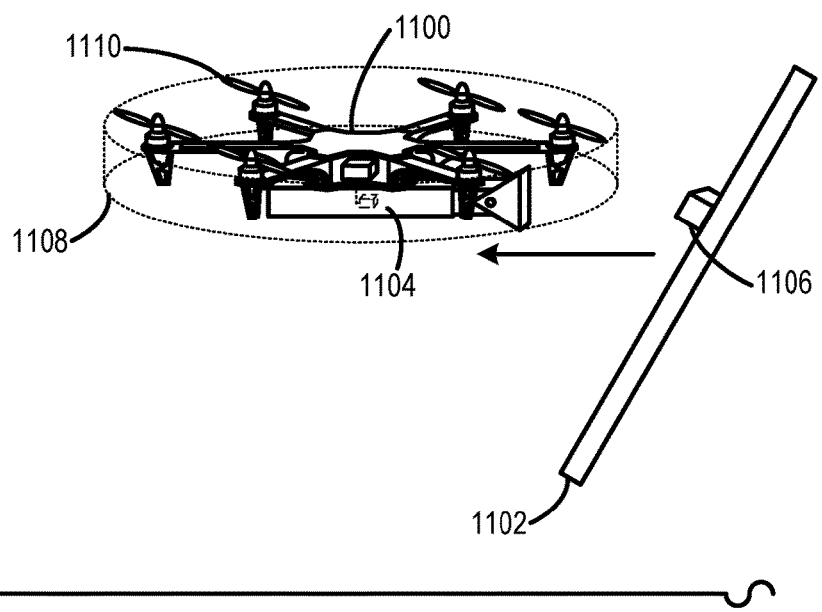
Figure 11E:
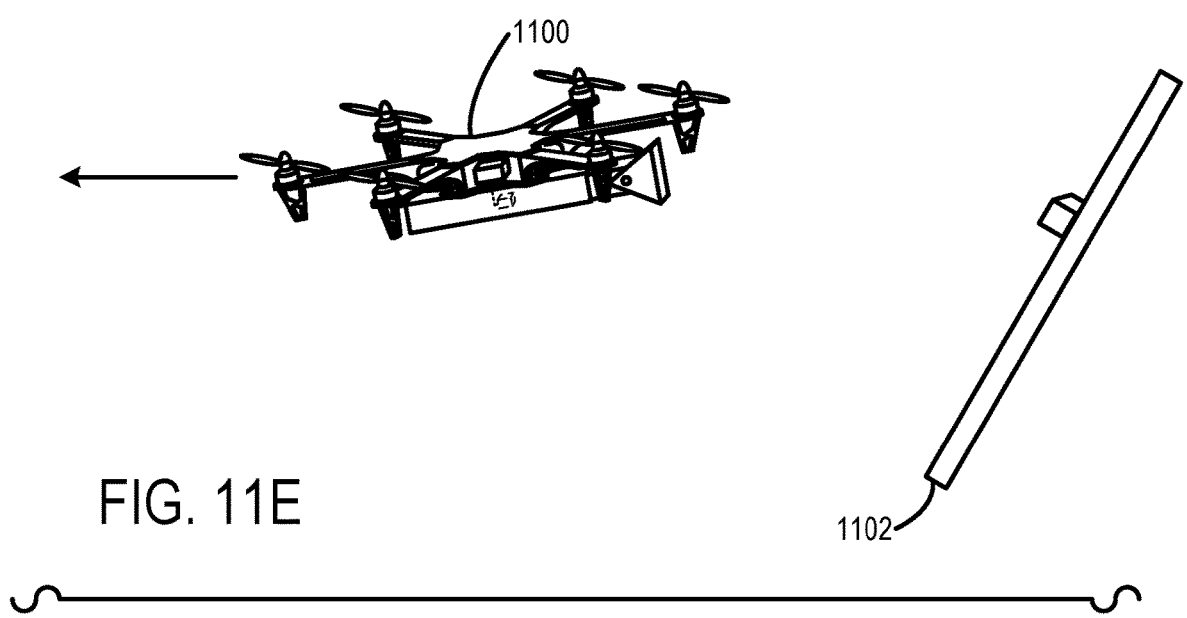

In FIG. 11D, the object 1106 is attached to the inclined surface 1102. The aerial vehicle 1100 releases the object 1106 from the compliant arm mechanism 1104 and moves the compliant arm mechanism 1104 from an extended position to a retracted position within the perimeter 1108 of the propulsion system 1110 of the aerial vehicle 1100. In FIG. 11E, the aerial vehicle 1100 controls the propulsion system 1110 to fly away from the inclined surface 1102 to return to base or fly another mission.

Figure 12A:
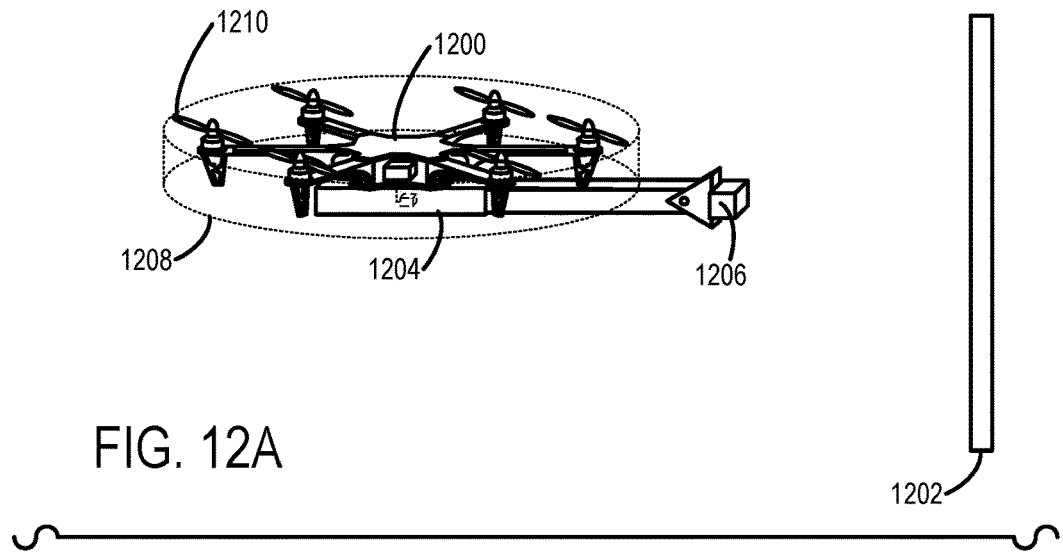
FIGS. 12A-12C are diagrammatic representations of an example scenario in which an aerial vehicle places an object on a vertical surface via a passively compliant arm mechanism.
Figure 12B:
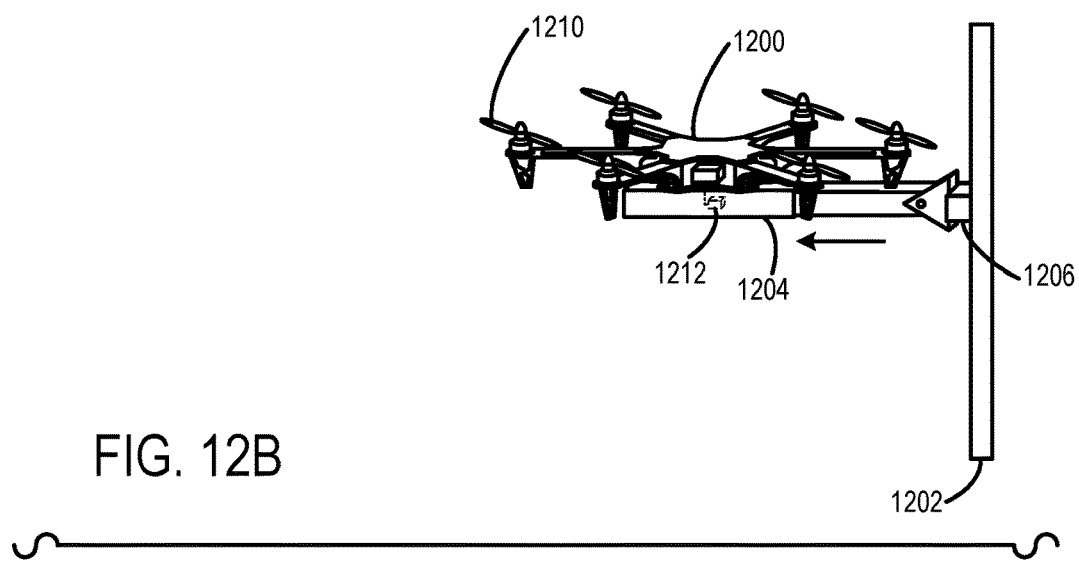
Figure 12C:
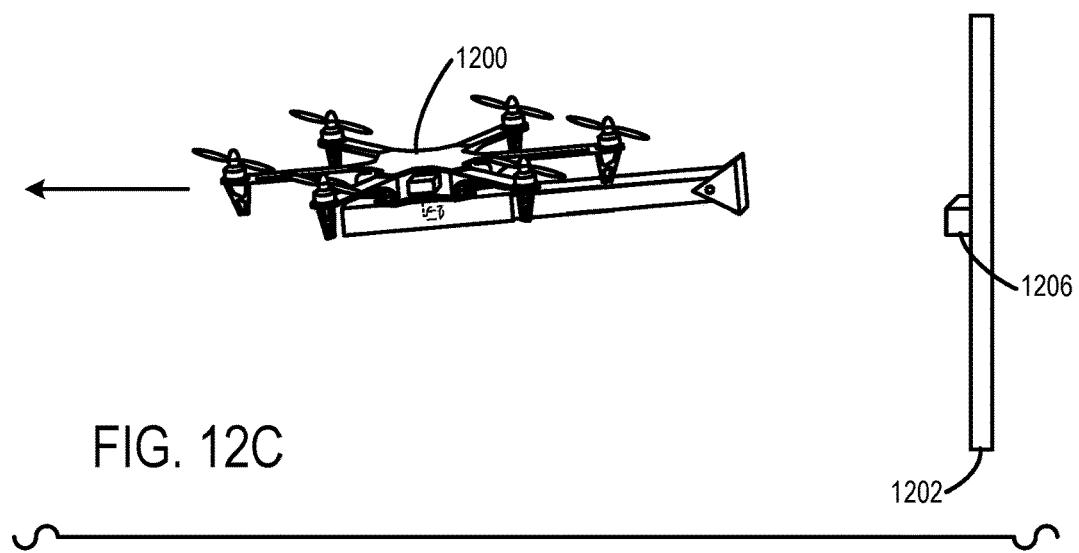

FIGS. 12A-12C are diagrammatic representations of an example scenario in which an aerial vehicle 1200 places an object 1206 on a vertical surface 1202 via a passively compliant arm mechanism 1204. The passively compliant arm mechanism 1204 is configured to extend laterally beyond a perimeter 1208 of a propulsion system 1210 of the aerial vehicle 1200 on a permanent basis, as opposed to actively moving between a retracted position and an extended position. In FIG. 12A, the aerial vehicle 1200 flies to an area proximate to the vertical surface 1202. In FIG. 12B, the aerial vehicle 1200 controls the propulsion system 1210 such that the passively compliant arm mechanism 1204 contacts the vertical surface 1202 via the object 1206. The aerial vehicle 1200 receives, via one or more sensors 1212, one or more sensor signals indicating contact of the passively compliant arm mechanism 1204 against the vertical surface 1202 via the object 1206. The aerial vehicle 1200 determines a force at which the aerial vehicle 1200 contacts the vertical surface 1202 based on the one or more sensor signals. The aerial vehicle 1200 controls a force exerted against the vertical surface 1202 by the object 1206 during placement of the object 1206 on the vertical surface 1202 based upon one or more sensor signals indicating a force exerted against the vertical surface 1202 by the object 1206 while placing the object 1206 on the vertical surface 1202. In FIG. 12C, the object 1206 is attached to the vertical surface 1202, and the aerial vehicle 1200 controls the propulsion system 1210 to fly away from the vertical surface 1202 to return to base or fly another mission.

Figure 13:
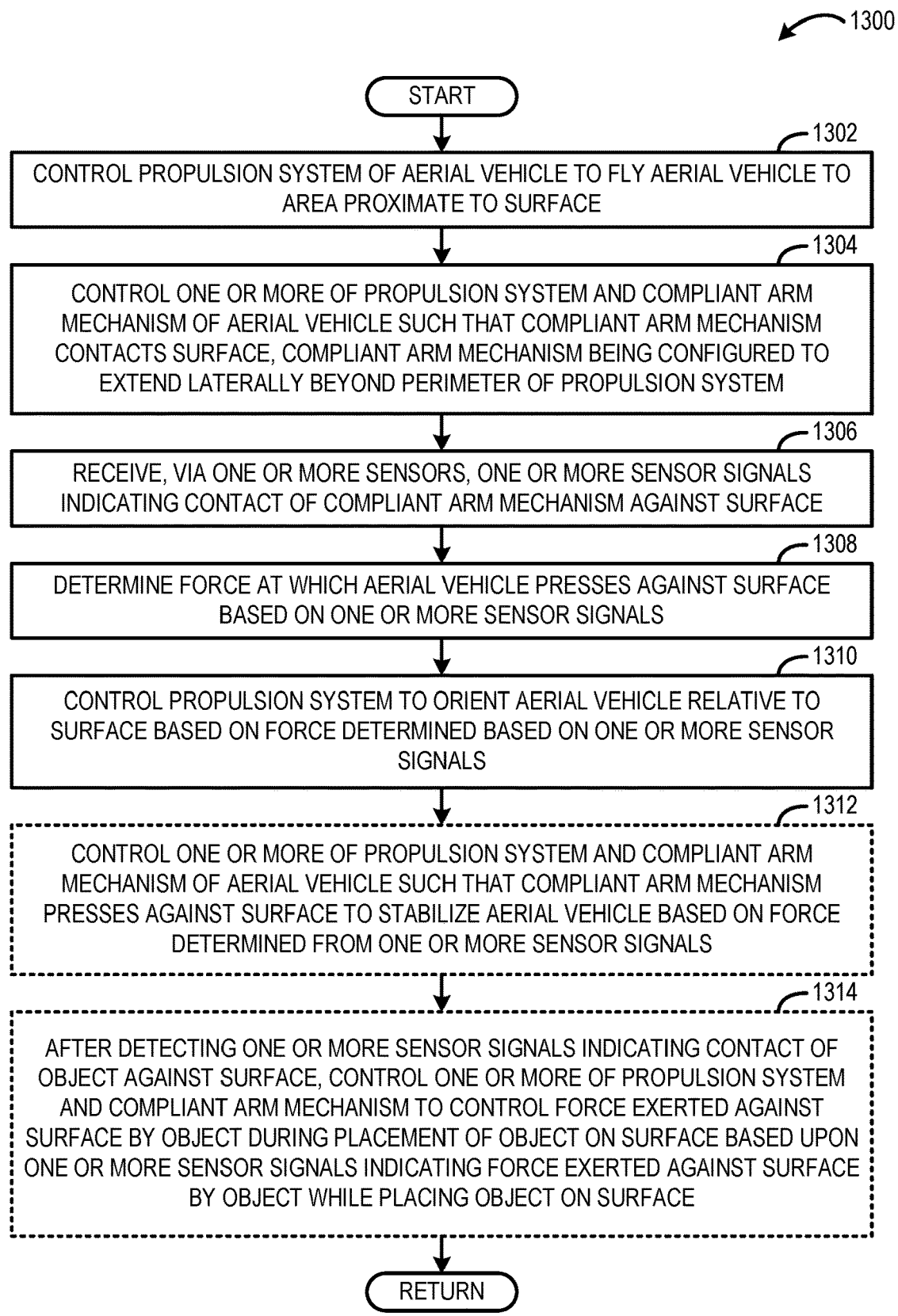
FIG. 13 is a flowchart of an exemplary embodiment of a method for controlling an aerial vehicle including a compliant arm mechanism.

FIG. 13 is a flowchart of an example method 1300 for controlling an aerial vehicle including a compliant arm mechanism. For example, the method 1300 may be performed by the aerial vehicle 100 shown in FIG. 1. At 1302, a propulsion system of the aerial vehicle is controlled to fly the aerial vehicle to an area proximate to a surface. At 1304, one or more of the propulsion system of the aerial vehicle and a compliant arm mechanism of the aerial vehicle is controlled such that the compliant arm mechanism contacts the surface. The compliant arm mechanism is configured to extend passively or actively laterally beyond a perimeter of the propulsion system to contact the surface. In some examples, controlling the compliant arm mechanism comprises moving the compliant arm mechanism from a retracted position to an extended position via an extendable joint. In some examples, controlling the compliant arm mechanism comprises moving the wrist joint to control a force exerted against the surface by the hand of the compliant arm mechanism.

At 1306, one or more sensor signals are received from one or more sensors. The sensor(s) may be located on the aerial vehicle, the surface, or another aerial vehicle, for example. The one or more sensor signals indicate contact of the compliant arm mechanism against the surface. At 1308, a force at which the aerial vehicle presses against the surface is determined based on the one or more sensor signals.

In some embodiments, at 1310, optionally the propulsion system of the aerial vehicle may be controlled to orient the aerial vehicle relative to the surface based on the force determined based on the one or more sensor signals. For example, the propulsion system could be controlled to orient a surface of the compliant arm mechanism to be parallel with the surface. In another example, the compliant arm mechanism could be controlled to orient a surface of the compliant arm mechanism to be parallel with the surface.

In some embodiments, at 1312, optionally one or more of the propulsion system and the compliant arm mechanism may be controlled such that the compliant arm mechanism presses against the surface to stabilize the aerial vehicle based on the force determined from the one or more sensor signals.

In some embodiments the compliant arm mechanism may be configured to releasably hold an object. Thus, at 1314, optionally after receiving one or more sensor signals indicating contact of the object against the surface, one or more of the propulsion system and the compliant arm mechanism may be controlled to control a force exerted against the surface by the object during placement of the object on the surface based upon one or more sensor signals indicating a force exerted against the surface by the object while placing the object on the surface.

The concepts described herein may be broadly applicable to any suitable type of aircraft, including fixed wing aircraft as well as manned and unmanned aircraft.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method for controlling an aerial vehicle comprising a compliant arm mechanism configured to releasably hold a plurality of objects for placement at different locations, the method comprising:
controlling a propulsion system of the aerial vehicle to fly the aerial vehicle to a first area proximate to a first surface;
controlling an extendable joint of the compliant arm mechanism to extend the compliant arm mechanism such that a first object of the plurality of objects contacts the first surface;
receiving, via a sensor, one or more sensor signals indicating a force exerted against the first surface by the first object;
controlling the extendable joint of the compliant arm mechanism based upon the one or more sensor signals to control the force exerted against the first surface by the first object during placement of the first object on the first surface;
controlling the propulsion system of the aerial vehicle to fly the aerial vehicle to a second area proximate to a second surface;
controlling the extendable joint of the compliant arm mechanism to extend the compliant arm mechanism such that a second object of the plurality of objects contacts the second surface;
receiving, via a sensor, one or more sensor signals indicating a force exerted against the second surface by the second object; and
controlling the extendable joint of the compliant arm mechanism based upon the one or more sensor signals to control the force exerted against the second surface by the second object during placement of the second object on the second surface.

2. The method of claim 1, further comprising:
controlling the propulsion system to orient the aerial vehicle relative to the first surface based on the force determined based on the one or more sensor signals.

3. The method of claim 1, wherein controlling the force exerted against the first surface during placement of the first object on the first surface comprises maintaining the force above a threshold force for at least a threshold duration.

4. The method of claim 1, wherein controlling the compliant arm mechanism comprises moving the compliant arm mechanism from a retracted position to an extended position via the extendable joint.

5. The method of claim 1, wherein the compliant arm mechanism includes a limb, a wrist joint coupled to the limb, and a hand coupled to the wrist joint, the wrist joint comprising at least one degree of freedom of movement, and wherein controlling the compliant arm mechanism comprises moving the wrist joint to control a force exerted against the first surface by the first object held by the hand.

6. The method of claim 1, wherein the compliant arm mechanism includes one or more motor-driven actuators to provide active compliance.

7. The method of claim 1, wherein the compliant arm mechanism comprises a magazine configured to hold the plurality of objects, and wherein the compliant arm mechanism is configured such that when one object is placed by the compliant arm mechanism a next object in the magazine is moved into a position to be placed by the compliant arm mechanism.

8. An aerial vehicle comprising:
an airframe;
a propulsion system coupled to the airframe;
a compliant arm mechanism coupled to the airframe, the compliant arm mechanism being configured to releasably hold a plurality of objects for placement at different locations, the compliant arm mechanism including an extendable joint, a limb coupled to the extendable joint, a wrist joint coupled to the limb, and a hand coupled to the wrist joint, the hand configured to releasably hold a first object of the plurality of objects;
a sensor configured to output one or more sensor signals indicating a force exerted against a surface by the first object; and
a controller configured to
control the extendable joint of the compliant arm mechanism to extend the compliant arm mechanism such that the first object contacts the surface,
receive, via the sensor, the one or more sensor signals, and
control the extendable joint of the compliant arm mechanism based upon the one or more sensor signals to control the force exerted against the surface by the first object during placement of the first object on the surface.

9. The aerial vehicle of claim 8, wherein the controller is configured to control the propulsion system to orient the aerial vehicle relative to the surface based on the force determined based on the one or more sensor signals.

10. The aerial vehicle of claim 8, wherein the extendable joint is configured to move between a retracted position and an extended position in which the compliant arm mechanism extends laterally beyond the perimeter of the propulsion system.

11. The aerial vehicle of claim 8, wherein the compliant arm mechanism includes one or more of a spring and a damper to provide passive compliance.

12. The aerial vehicle of claim 8, wherein the compliant arm mechanism includes one or more motor-driven actuators to provide active compliance.

13. The aerial vehicle of claim 8, wherein the wrist joint is passively compliant.

14. The aerial vehicle of claim 8, wherein the wrist joint comprises at least two degrees of freedom of movement.

15. The aerial vehicle of claim 8, wherein the compliant arm mechanism comprises a magazine configured to hold the plurality of objects, and wherein the compliant arm mechanism is configured such that when one object is placed by the compliant arm mechanism a next object in the magazine is moved into a position to be placed by the compliant arm mechanism.

16. A compliant arm mechanism removably attachable to an airframe of an aerial vehicle, the compliant arm mechanism comprising:
a limb configured to releasably hold a plurality of objects;

a wrist joint coupled to the limb;

a hand coupled to the wrist joint, the hand configured to releasably hold a first object of the plurality of objects; and an extendable joint coupled to the limb and configured to extend the compliant arm mechanism such that the first object contacts a surface adjacent the aerial vehicle, wherein the extendable joint of the compliant arm mechanism is electronically controllable to control a force exerted against the surface by the first object during placement of the first object on the surface by the aerial vehicle.

17. The compliant arm mechanism of claim 16, wherein the extendable joint is configured to move between a retracted position and an extended position.

18. The compliant arm mechanism of claim 16, wherein the compliant arm mechanism includes one or more of a spring and a damper to provide passive compliance.

19. The compliant arm mechanism of claim 16, wherein the compliant arm mechanism includes one or more motor-driven actuators to provide active compliance.

20. The compliant arm mechanism of claim 16, wherein the compliant arm mechanism comprises a magazine configured to hold the plurality of objects, and wherein the compliant arm mechanism is configured such that when one object is placed by the compliant arm mechanism a next object in the magazine is moved into a position to be placed by the compliant arm mechanism.

\* \* \* \* \*